(12) United States Patent
Matsusue

(10) Patent No.: US 11,742,499 B2
(45) Date of Patent: Aug. 29, 2023

(54) FUEL CELL SYSTEM

(71) Applicant: TOYOTA JIDOSHA KABUSHIKI KAISHA, Toyota (JP)

(72) Inventor: Masaaki Matsusue, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/653,405

(22) Filed: Mar. 3, 2022

(65) Prior Publication Data

US 2022/0285703 A1 Sep. 8, 2022

(30) Foreign Application Priority Data

Mar. 4, 2021 (JP) .................................. 2021-034297

(51) Int. Cl.
| | |
|---|---|
| *H01M 8/04* | (2016.01) |
| *H01M 8/04119* | (2016.01) |
| *H01M 8/04082* | (2016.01) |
| *H01M 8/0438* | (2016.01) |
| *H01M 8/04537* | (2016.01) |
| *H01M 8/0432* | (2016.01) |

(52) U.S. Cl.
CPC ..... *H01M 8/04164* (2013.01); *H01M 8/0432* (2013.01); *H01M 8/04201* (2013.01); *H01M 8/04395* (2013.01); *H01M 8/04589* (2013.01)

(58) Field of Classification Search
CPC ......... H01M 8/04164; H01M 8/04201; H01M 8/0432; H01M 8/04395; H01M 8/04589
See application file for complete search history.

(56) References Cited

U.S. PATENT DOCUMENTS

2019/0288305 A1* 9/2019 Ohashi ............... H01M 8/04111

FOREIGN PATENT DOCUMENTS

| JP | 2004020330 A | 1/2004 |
|---|---|---|
| JP | 2006253096 A | 9/2006 |
| JP | 2013196905 A | 9/2013 |

\* cited by examiner

*Primary Examiner* — Olatunji A Godo
(74) *Attorney, Agent, or Firm* — Dickinson Wright, PLLC

(57) ABSTRACT

To provide a fuel cell system configured to reduce false cross leak judgment. A fuel cell system wherein the controller preliminarily stores a first data group indicating a relationship between the flow rate of the oxidant gas, the opening degree of the bypass valve, and the hydrogen concentration of the oxidant off-gas; and wherein before the controller determines whether or not a cross leak has occurred, the controller varies the hydrogen concentration threshold used for determining whether or not a cross leak has occurred, by comparing the flow rate of the oxidant gas measured by the oxidant gas flow rate sensor and the opening degree of the bypass valve with the first data group.

6 Claims, 3 Drawing Sheets

FUEL CELL SYSTEM

TECHNICAL FIELD

The disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be referred to as "stack") composed of stacked unit fuel cells (hereinafter may be referred to as "cell"). In many cases, the fuel gas and oxidant gas actually supplied to the fuel cell, are mixtures with gases that do not contribute to oxidation and reduction. Especially, the oxidant gas is often air containing oxygen.

Hereinafter fuel gas and oxidant gas may be collectively and simply referred to as "reaction gas" or "gas". Also, a single unit fuel cell and a fuel cell stack composed of stacked unit cells may be referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle").

For example, Patent Literature 1 discloses a fuel cell system which retains a hydrogen sensor installed in a cathode off-gas passage from getting poisoned by silicon or the like.

Patent Literature 2 discloses a gas detection method that suppresses deterioration of a gas sensor, such as a reduction in sensitivity, while maintaining desired detection accuracy of a gas to be detected.

Patent Literature 3 discloses an anomaly detection device of a fuel cell which can precisely detect the occurrence of cross leak.

Patent Literature 1: Japanese Patent Application Laid-Open (JP-A) No. 2013-196905
Patent Literature 2: JP-A No. 2004-020330
Patent Literature 3: JP-A No. 2006-253096

It is desired to establish a fuel cell system technique that properly detects a so-called cross leak in which a fuel gas containing hydrogen penetrates an electrolyte membrane.

In Patent Literature 1, the adherence of contamination on the hydrogen concentration sensor can be reduced by diluting cathode off-gas with fresh air that has bypassed the fuel cell. However, when the amount of air supplied to the fuel cell varies depending on the power required for the fuel cell, the amount of the fresh air for diluting the cathode off-gas also varies. Accordingly, the concentration of oxygen contained in the cathode off-gas diluted with the air, varies and may cause a variation in hydrogen concentration detection and an error in determining whether or not there is a cross leak. If it is determined that there is a cross leak, the vehicle is stopped since there is a possibility of hydrogen leakage. Even when there is actually no cross leak, however, if it is erroneously determined that there is a cross leak, inconveniences may be caused to the user, such as unnecessary stopping of the vehicle.

SUMMARY

The disclosed embodiments were achieved in light of the above circumstances. An object of the disclosed embodiments is to provide a fuel cell system configured to reduce false cross leak judgment.

In a first embodiment, there is provided a fuel cell system, wherein the fuel cell system comprises:
a fuel cell,
an oxidant gas supplier for supplying oxidant gas to the fuel cell,
an oxidant gas supply flow path connecting the oxidant gas supplier and an oxidant gas inlet of the fuel cell,
an oxidant gas flow rate sensor disposed in the oxidant gas supply flow path,
an oxidant off-gas discharge flow path for allowing oxidant off-gas to be discharged from an oxidant gas outlet of the fuel cell to the outside,
an oxidant gas bypass flow path branching from the oxidant gas supply flow path, bypassing the fuel cell, and connecting a branch of the oxidant gas supply flow path and a first junction of the oxidant off-gas discharge flow path,
a bypass valve disposed in the oxidant gas bypass flow path,
a hydrogen concentration sensor disposed downstream from the first junction of the oxidant off-gas discharge flow path, and
a controller,
wherein the controller controls driving of the oxidant gas supplier and controls an opening degree of the bypass valve;
wherein the controller determines whether or not a cross leak has occurred, from the hydrogen concentration of the oxidant off-gas measured by the hydrogen concentration sensor;
wherein, when the hydrogen concentration of the oxidant off-gas measured by the hydrogen concentration sensor is equal to or more than a predetermined threshold, the controller determines that a cross leak has occurred;
wherein the controller preliminarily stores a first data group indicating a relationship between the flow rate of the oxidant gas, the opening degree of the bypass valve, and the hydrogen concentration of the oxidant off-gas; and wherein before the controller determines whether or not a cross leak has occurred, the controller varies the hydrogen concentration threshold used for determining whether or not a cross leak has occurred, by comparing the flow rate of the oxidant gas measured by the oxidant gas flow rate sensor and the opening degree of the bypass valve with the first data group.

The fuel cell system further may comprise a temperature sensor for detecting a temperature of the fuel cell;

the oxidant gas supplier may be an air compressor;

the controller may preliminarily store a second data group indicating a relationship between a rotational frequency of the air compressor, the temperature of the fuel cell, and the hydrogen concentration of the oxidant off-gas; and before the controller determines whether or not a cross leak has occurred, the controller may vary the hydrogen concentration threshold used for determining whether or not a cross leak has occurred, by comparing the rotational frequency of the air compressor and the temperature of the fuel cell measured by the temperature sensor with the second data group.

The fuel cell system may further comprise:

a fuel gas supplier for supplying fuel gas to the fuel cell, a fuel gas supply flow path connecting a fuel gas inlet of the fuel cell and the fuel gas supplier, an ejector disposed in the fuel gas supply flow path, a fuel off-gas discharge flow path for discharging, to the outside of the fuel cell system, the fuel off-gas discharged from a fuel gas outlet of the fuel cell, an anode gas-liquid separator disposed in the fuel off-gas discharge flow path, a vent and discharge valve disposed downstream from the anode gas-liquid separator of the fuel off-gas discharge flow path, and a circulation flow path connecting the anode gas-liquid separator and the ejector;

the oxidant off-gas discharge flow path may include, downstream from the first junction, a second junction where the fuel off-gas discharge flow path joins the oxidant off-gas discharge flow path; and the hydrogen concentration sensor may be disposed in a region between the first and second junctions of the oxidant off-gas discharge flow path.

The fuel cell system may further comprise:

a cathode gas-liquid separator disposed upstream from the first junction of the oxidant off-gas discharge flow path, and a water discharge flow path for allowing liquid water to be discharged from the cathode gas-liquid separator.

Before the controller determines whether or not a cross leak has occurred, the controller may determine whether or not the bypass valve is opened;

when the controller determines that the bypass valve is opened, the controller may set the hydrogen concentration threshold used for determining whether or not a cross leak has occurred, to a second concentration threshold C2 which is larger than a first concentration threshold C1; and when the controller determines that the bypass valve is closed, the controller may set the hydrogen concentration threshold used for determining whether or not a cross leak has occurred, to the first concentration threshold C1.

The fuel cell system may further comprise a temperature sensor for detecting a temperature of the fuel cell;

before the controller determines whether or not a cross leak has occurred, the controller may determine whether or not the temperature of the fuel cell detected by the temperature sensor is equal to or less than an optimum predetermined temperature threshold for operation of the fuel cell;

when the controller determines that the temperature of the fuel cell detected by the temperature sensor exceeds the optimum predetermined temperature threshold for the operation of the fuel cell, the controller may set the hydrogen concentration threshold used for determining whether or not a cross leak has occurred, to the first concentration threshold C1;

when the controller determines that the temperature of the fuel cell detected by the temperature sensor is equal to or less than the optimum predetermined temperature threshold for the operation of the fuel cell, the controller may determine whether or not the bypass valve is opened;

when the controller determines that the bypass valve is opened, the controller may set the hydrogen concentration threshold used for determining whether or not a cross leak has occurred, to the second concentration threshold C2; and when the controller determines that the bypass valve is closed, the controller may set the hydrogen concentration threshold used for determining whether or not a cross leak has occurred, to the first concentration threshold C1.

The fuel cell system may further comprise a current sensor for detecting a current value of the fuel cell;

before the controller determines whether or not a cross leak has occurred, the controller may determine whether or not the current value of the fuel cell detected by the current sensor is equal to or less than a predetermined current threshold;

when the controller determines that the current value of the fuel cell detected by the current sensor exceeds the predetermined current threshold, the controller may set the hydrogen concentration threshold used for determining whether or not a cross leak has occurred, to the first concentration threshold C1;

when the controller determines that the current value of the fuel cell detected by the current sensor is equal to or less than the predetermined current threshold, the controller may determine whether or not the bypass valve is opened;

when the controller determines that the bypass valve is opened, the controller may set the hydrogen concentration threshold used for determining whether or not a cross leak has occurred, to the second concentration threshold C2; and when the controller determines that the bypass valve is closed, the controller may set the hydrogen concentration threshold used for determining whether or not the cross leak has occurred, to the first concentration threshold C1.

According to the fuel cell system of the disclosed embodiments, false cross leak judgment is reduced.

BRIEF DESCRIPTION OF THE DRAWINGS

In the accompanying drawings.

DETAILED DESCRIPTION

Figure 1:
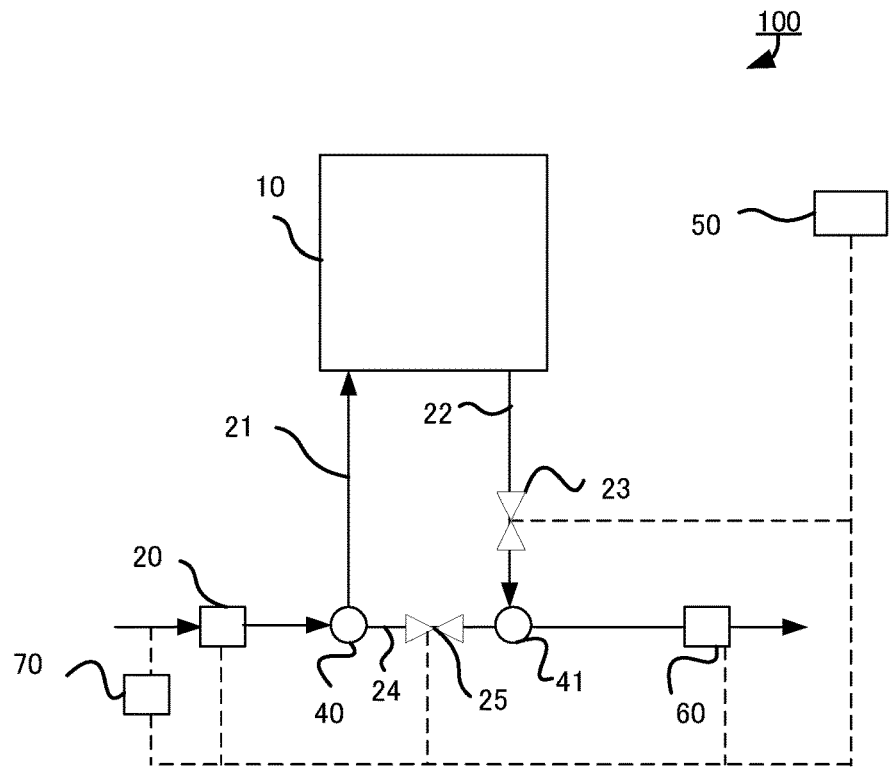
FIG. 1 is a schematic configuration diagram of an example of the fuel cell system of the disclosed embodiments.

The fuel cell system of the disclosed embodiments is a fuel cell system,
wherein the fuel cell system comprises:
a fuel cell,
an oxidant gas supplier for supplying oxidant gas to the fuel cell,
an oxidant gas supply flow path connecting the oxidant gas supplier and an oxidant gas inlet of the fuel cell,
an oxidant gas flow rate sensor disposed in the oxidant gas supply flow path,
an oxidant off-gas discharge flow path for allowing oxidant off-gas to be discharged from an oxidant gas outlet of the fuel cell to the outside,
an oxidant gas bypass flow path branching from the oxidant gas supply flow path, bypassing the fuel cell, and connecting a branch of the oxidant gas supply flow path and a first junction of the oxidant off-gas discharge flow path,
a bypass valve disposed in the oxidant gas bypass flow path,
a hydrogen concentration sensor disposed downstream from the first junction of the oxidant off-gas discharge flow path, and
a controller,
wherein the controller controls driving of the oxidant gas supplier and controls an opening degree of the bypass valve;
wherein the controller determines whether or not a cross leak has occurred, from the hydrogen concentration of the oxidant off-gas measured by the hydrogen concentration sensor;
wherein, when the hydrogen concentration of the oxidant off-gas measured by the hydrogen concentration sensor is equal to or more than a predetermined threshold, the controller determines that a cross leak has occurred;
wherein the controller preliminarily stores a first data group indicating a relationship between the flow rate of the oxidant gas, the opening degree of the bypass valve, and the hydrogen concentration of the oxidant off-gas; and
wherein before the controller determines whether or not a cross leak has occurred, the controller varies the hydrogen concentration threshold used for determining whether or not a cross leak has occurred, by comparing the flow rate of the oxidant gas measured by the oxidant gas flow rate sensor and the opening degree of the bypass valve with the first data group.

The fuel cell system of the disclosed embodiments varies the sensitivity of the hydrogen concentration sensor, i.e., the hydrogen concentration threshold for determining a cross leak, according to the amount of fresh air that has bypassed the fuel cell. More specifically, when the amount of the fresh air increases and when there is a possibility that the error of hydrogen concentration detection increases, the sensitivity of the hydrogen concentration sensor is decreased, and the hydrogen concentration threshold for determining a cross leak is increased.

In the disclosed embodiments, from the viewpoint of suppressing false cross leak judgment, the hydrogen concentration sensor for detecting the perforation of the electrolyte membrane, which is a cause of cross leak, is disposed after the cathode gas-liquid separator of the oxidant off-gas discharge flow path, after the oxidant off-gas discharge flow path joins the oxidant gas bypass flow path, and before the oxidant off-gas discharge flow path joins the fuel off-gas discharge flow path. The detection threshold is changed according to the magnitude of the flow rate of the oxidant gas bypass flow path.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In general, the fuel cell system of the disclosed embodiments is installed and used in a vehicle including a motor as a driving source.

The fuel cell system of the disclosed embodiments may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the disclosed embodiments.

The fuel cell system of the disclosed embodiments includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum, (Pt) and ruthenium (Ru). As a catalyst-supporting material and a conductive material, examples include, but are not limited to, a carbonaceous material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, an aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold, and a refrigerant inlet manifold.

As the outlet manifold, examples include, but are not limited to, an anode outlet manifold, a cathode outlet manifold, and a refrigerant outlet manifold.

As the oxidant gas system of the fuel cell, the fuel cell system may include an oxidant gas supplier, an oxidant gas supply flow path, an oxidant gas flow rate sensor, an oxidant off-gas discharge flow path, an oxidant gas bypass flow path, a bypass valve, a hydrogen concentration sensor, and a controller.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold, or the like.

The oxidant off-gas discharge flow path is connected to the oxidant gas outlet of the fuel cell. The oxidant off-gas discharge flow path allows the oxidant off-gas, which is discharged from the oxidant gas outlet of the fuel cell, to be discharged to the outside. The oxidant gas outlet may be the oxidant gas discharge hole, the cathode outlet manifold, or the like.

The oxidant off-gas discharge flow path may include the first junction where the oxidant gas bypass flow path joins the oxidant off-gas discharge flow path.

The oxidant off-gas discharge flow path may include, downstream from the first junction, the second junction where the fuel off-gas discharge flow path joins the oxidant off-gas discharge flow path.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The oxidant gas bypass flow path branches from the oxidant gas supply flow path, bypasses the fuel cell, and connects the branch of the oxidant gas supply flow path and the first junction of the oxidant off-gas discharge flow path.

The bypass valve is disposed in the oxidant gas bypass flow path.

The bypass valve is electrically connected to the controller. By opening the bypass valve by the controller, when the supply of the oxidant gas to the fuel cell is unnecessary, the oxidant gas can bypass the fuel cell and be discharged to the outside from the oxidant off-gas discharge flow path.

The oxidant gas flow rate sensor is disposed in the oxidant gas supply flow path.

The oxidant gas flow rate sensor detects the flow rate of the oxidant gas in the oxidant gas system. The oxidant gas flow rate sensor is electrically connected to the controller. The controller may estimate the rotational frequency of the air compressor from the flow rate of the oxidant gas detected by the oxidant gas flow rate sensor. The oxidant gas flow rate sensor may be disposed upstream from the oxidant gas supplier of the oxidant gas supply flow path.

As the oxidant gas flow rate sensor, a conventionally-known flow meter or the like may be used.

The hydrogen concentration sensor is disposed downstream from the first junction of the oxidant off-gas discharge flow path.

The hydrogen concentration sensor detects the hydrogen concentration of the oxidant off-gas. The hydrogen concentration sensor is electrically connected to the controller. The controller determines the presence or absence of a cross leak from the hydrogen concentration detected by the hydrogen concentration sensor. When the oxidant off-gas discharge flow path includes, downstream from the first junction, the second junction where the fuel off-gas discharge flow path joins the oxidant off-gas discharge flow path, the hydrogen concentration sensor may be disposed in a region which is downstream from the first junction of the oxidant off-gas discharge flow path and which is upstream from the second junction of the oxidant off-gas discharge flow path.

As the hydrogen concentration sensor, a conventionally-known concentration meter or the like may be used.

When the hydrogen concentration sensor is disposed after the oxidant off-gas discharge flow path joins the fuel off-gas discharge flow path, the hydrogen concentration of the oxidant off-gas increases at the time of opening the vent and discharge valve of the anode.

For example, when the diversion of air increases in order to dilute discharged hydrogen discharged from the vent and discharge valve, and when the diversion of air increases in order to avoid the surge region of the air compressor (ACP), the oxygen concentration increases; a variation in the hydrogen concentration measurement increases; and there is a possibility that the measurement becomes impossible in the worst case.

Accordingly, by disposing the hydrogen concentration sensor before the oxidant off-gas discharge flow path joins the fuel off-gas discharge flow path, disturbance can be suppressed, and a cross leak can be constantly detected with high accuracy.

The fuel cell system may further include the cathode gas-liquid separator and the water discharge flow path.

The cathode gas-liquid separator is disposed upstream from the first junction of the oxidant off-gas discharge flow path. The cathode gas-liquid separator can suppress the adherence of water to components disposed in the oxidant off-gas discharge flow path, such as the hydrogen concentration sensor and the oxidant gas pressure control valve.

The water discharge flow path branches from the oxidant off-gas discharge flow path through the cathode gas-liquid separator to allow liquid water to be discharged from the cathode gas-liquid separator. A water discharge valve may be disposed in the water discharge flow path. The water discharge valve is electrically connected to the controller. By opening the water discharge valve by the controller, the liquid water is discharged from the water discharge flow path to the outside. The water discharge flow path may join the oxidant off-gas discharge from path, downstream from the hydrogen concentration sensor of the oxidant off-gas discharge flow path.

When the hydrogen concentration sensor is used in the oxidant off-gas discharge flow path in order to detect the perforation of the electrolyte membrane, which is a cause of cross leak, and when the cathode gas-liquid separator is not disposed in the oxidant off-gas discharge flow path, the results of the hydrogen concentration measurement result largely varies due to excess water in the oxidant off-gas, and there is a possibility that the measurement becomes impossible in the worst case.

Accordingly, by disposing the hydrogen concentration sensor after the cathode gas-liquid separator, the influence of water can be eliminated, and the measurement accuracy can be increased.

The fuel cell system may include a humidifier.

The humidifier connects a region of the oxidant gas supply flow path, which is a region downstream from the oxidant gas supplier, and a region of the oxidant off-gas discharge flow path, which is a region downstream from the cathode gas-liquid separator. The humidifier recovers water vapor discharged from the cathode gas-liquid separator, sends the water vapor to the oxidant gas supply flow path, and adjusts the humidity of the oxidant gas.

The fuel cell system may include the current sensor.

The current sensor detects the current of the fuel cell. The current sensor is electrically connected to the controller. The controller may estimate the opening degree of the bypass valve from the current detected by the current sensor. The position of the current sensor is not particularly limited, as long as it can detect the current of the fuel cell.

As the current sensor, a conventionally-known ammeter or the like may be used.

The fuel cell system may include the temperature sensor.

The temperature sensor detects the temperature of the fuel cell. The temperature of the fuel cell may be the temperature of the refrigerant flowing through the fuel cell. The temperature sensor is electrically connected to the controller. The position of the temperature sensor is not particularly limited, as long as it can detect the temperature of the fuel cell.

As the temperature sensor, a conventionally-known thermometer or the like may be used.

The fuel cell system may include, as the fuel gas system of the fuel cell, the fuel gas supplier, the fuel gas supply flow path, the ejector, the fuel off-gas discharge flow path, the anode gas-liquid separator, the vent and discharge valve, and the circulation flow path.

The fuel gas supplier supplies the fuel gas to the fuel cell. More specifically, the fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

In the fuel gas supply flow path, the ejector may be disposed.

For example, the ejector may be disposed at a junction with the circulation flow path on the fuel gas supply flow path. The ejector supplies a mixed gas containing the fuel gas and circulation gas to the anode of the fuel cell. As the ejector, a conventionally-known ejector may be used.

The fuel off-gas discharge flow path discharges, to the outside of the fuel cell system, the fuel off-gas discharged from the fuel gas outlet of the fuel cell. The fuel gas outlet may be the fuel gas discharge hole, the anode outlet manifold, or the like.

The anode gas-liquid separator may be disposed in the fuel off-gas discharge flow path.

The anode gas-liquid separator may be disposed at the branch point of the fuel off-gas discharge flow path and the circulation flow path.

The anode gas-liquid separator is disposed upstream from the vent and discharge valve of the fuel off-gas discharge flow path.

The anode gas-liquid separator separates the water and fuel gas contained in the fuel off-gas, which is the fuel gas discharged from the fuel gas outlet. Accordingly, the fuel gas may be returned to the circulation flow path as the circulation gas, or unnecessary gas, water and the like may be discharged to the outside by opening the vent and discharge valve of the fuel off-gas discharge flow path. In addition, the anode gas-liquid separator can suppress the flow of excess water into the circulation flow path. Accordingly, the occurrence of freezing of the circulation pump or the like due to the water, can be suppressed.

The vent and discharge valve (the fuel off-gas discharge valve) may be disposed in the fuel off-gas discharge flow path. The vent and discharge valve is disposed downstream from the gas-liquid separator in the fuel off-gas discharge flow path.

The vent and discharge valve allows the fuel off-gas, water and the like to be discharged to the outside (of the system). The outside may be the outside of the fuel cell system, or it may be the outside of the vehicle.

The vent and discharge valve may be electrically connected to the controller, and the flow rate of the fuel off-gas discharged to the outside may be controlled by controlling the opening and closing of the vent and discharge valve by the controller. By controlling the opening degree of the vent and discharge valve, the pressure of the fuel gas supplied to the anode of the fuel cell (anode pressure) may be controlled.

The fuel off-gas may contain the fuel gas that has passed through the anode without reacting and the water generated at the cathode and delivered to the anode. In some cases, the fuel off-gas contains corroded substances generated in the catalyst layer, the electrolyte membrane or the like, and the oxidant gas or the like allowed to be supplied to the anode during a purge.

The circulation flow path connects the anode gas-liquid separator and the ejector.

The circulation flow path allows the fuel off-gas, which is the fuel gas discharged from the fuel gas outlet of the fuel cell, to be recovered and supplied to the fuel cell as the circulation gas.

The circulation flow path may branch from the fuel off-gas discharge flow path through the anode gas-liquid separator and connect to the ejector disposed in the fuel gas supply flow path, thereby merging with the fuel gas supply flow path.

The circulation pump may be disposed in the circulation flow path.

The circulation pump circulates the fuel off-gas as the circulation gas. The circulation pump may be electrically connected to the controller, and the flow rate of the circulation gas may be controlled by controlling the turning on/off, rotational frequency, etc., of the circulation pump by the controller.

The fuel cell system may include a refrigerant supplier and a refrigerant circulation flow path as the cooling system of the fuel cell.

The refrigerant circulation flow path communicates between the refrigerant supply and discharge holes provided in the fuel cell, and it allows the refrigerant supplied from the refrigerant supplier to be circulated inside and outside the fuel cell.

The refrigerant supplier is electrically connected to the controller. The refrigerant supplier is driven according to a control signal from the controller. The flow rate of the refrigerant supplied from the refrigerant supplier to the fuel cell, is controlled by the controller. The temperature of the fuel cell may be controlled thereby.

As the refrigerant supplier, examples include, but are not limited to, a cooling water pump.

The refrigerant circulation flow path may be provided with a radiator for heat dissipation from the cooling water.

The refrigerant circulation flow path may be provided with a reserve tank for storing the refrigerant.

The fuel cell system may include a secondary cell.

The secondary cell (battery) may be any chargeable and dischargeable cell. For example, the secondary cell may be a conventionally known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

The controller controls the driving of the oxidant gas supplier and controls the opening degree of the bypass valve.

The controller determines whether or not a cross leak has occurred, from the hydrogen concentration of the oxidant off-gas measured by the hydrogen concentration sensor.

When the hydrogen concentration of the oxidant off-gas measured by the hydrogen concentration sensor is equal to or more than the predetermined threshold, the controller determines that a cross leak has occurred.

The controller preliminarily stores the first data group indicating the relationship between the flow rate of the oxidant gas, the opening degree of the bypass valve, and the hydrogen concentration of the oxidant off-gas.

Before the controller determines whether or not a cross leak has occurred, the controller varies the hydrogen concentration threshold used for determining whether or not a cross leak has occurred, by comparing the flow rate of the oxidant gas measured by the oxidant gas flow rate sensor and the opening degree of the bypass valve with the first data group.

When the fuel cell system further includes the temperature sensor and when the oxidant gas supplier is the air compressor, the controller may preliminarily store the second data group indicating the relationship between the rotational frequency of the air compressor, the temperature of the fuel cell, and the hydrogen concentration of the oxidant off-gas.

Before the controller determines whether or not a cross leak has occurred, the controller may vary the hydrogen concentration threshold used for determining whether or not a cross leak has occurred, by comparing the rotational frequency of the air compressor and the temperature of the fuel cell measured by the temperature sensor with the second data group.

Before the controller determines whether or not a cross leak has occurred, the controller may determine whether or not the bypass valve is opened.

When the controller determines that the bypass valve is opened, the controller may set the hydrogen concentration threshold used for determining whether or not a cross leak has occurred, to the second concentration threshold C2 which is larger than the first concentration threshold C1.

When the controller determines that the bypass valve is closed, the controller may set the hydrogen concentration threshold used for determining whether or not a cross leak has occurred, to the first concentration threshold C1.

When the bypass valve is opened, since the oxygen concentration of the oxidant off-gas increases as compared with the case where the bypass valve is closed, there is a large variation in the hydrogen concentration measurement. Accordingly, when the bypass valve is opened, the sensitivity of the hydrogen concentration sensor is decreased, and the hydrogen concentration threshold for determining a cross leak is increased to the second concentration threshold C2 which is larger than the first concentration threshold C1.

On the other hand, when the bypass valve is closed, since there is a small variation in the hydrogen concentration measurement, the sensitivity of the hydrogen concentration sensor is increased, and the hydrogen concentration threshold for determining a cross leak is set and decreased to the first concentration threshold C1.

The first concentration threshold C1 and the second concentration threshold C2 can be appropriately set based on the first data group and the second data group, respectively.

When the fuel cell system further includes the temperature sensor, before the controller determines whether or not a cross leak has occurred, the controller may determine whether or not the temperature of the fuel cell detected by the temperature sensor is equal to or less than the optimum predetermined temperature threshold for the operation of the fuel cell.

When the controller determines that the temperature of the fuel cell detected by the temperature sensor exceeds the optimum predetermined temperature threshold for the operation of the fuel cell, the controller may set the hydrogen concentration threshold used for determining whether or not a cross leak has occurred, to the first concentration threshold C1.

When the controller determines that the temperature of the fuel cell detected by the temperature sensor is equal to or less than the optimum predetermined temperature threshold for the operation of the fuel cell, the controller may determine whether or not the bypass valve is opened.

When the controller determines that the bypass valve is opened, the controller may set the hydrogen concentration threshold used for determining whether or not a cross leak has occurred, to the second concentration threshold C2.

When the controller determines that the bypass valve is closed, the controller may set the hydrogen concentration threshold used for determining whether or not a cross leak has occurred, to the first concentration threshold C1.

The optimum predetermined temperature for the operation of the fuel cell, may be from 60° C. to 70° C., for example. When the fuel cell temperature exceeds the optimum predetermined temperature for the operation of the fuel cell, the hydrogen concentration threshold may be set to a small value, since the electrolyte membrane is dried, and the amount of the hydrogen that penetrates the electrolyte membrane is decreased. For example, the hydrogen concentration threshold may be set to the first concentration threshold C1.

When the fuel cell system further includes the current sensor, before the controller determines whether or not a cross leak has occurred, the controller may determine whether or not the current value of the fuel cell detected by the current sensor is equal to or less than the predetermined current threshold.

When the controller determines that the current value of the fuel cell detected by the current sensor exceeds the predetermined current threshold, the controller may set the hydrogen concentration threshold used for determining whether or not a cross leak has occurred, to the first concentration threshold C1.

When the controller determines that the current value of the fuel cell detected by the current sensor is equal to or less than the predetermined current threshold, the controller may determine whether or not the bypass valve is opened.

When the controller determines that the bypass valve is opened, the controller may set the hydrogen concentration threshold used for determining whether or not a cross leak has occurred, to the second concentration threshold C2.

When the controller determines that the bypass valve is closed, the controller may set the hydrogen concentration threshold used for determining whether or not the cross leak has occurred, to the first concentration threshold C1.

For example, the predetermined current threshold of the fuel cell may be the value of current in an optimum condition for the operation of the fuel cell. When the current value of the fuel cell exceeds the current value in the optimum condition for the operation of the fuel cell, since the fuel cell is in the condition of high load, the amount of the hydrogen that penetrates the electrolyte membrane, is also decreased. Accordingly, the hydrogen concentration threshold may be set to a small value, and it may be set to the first concentration threshold C1.

FIG. 1 is a schematic configuration diagram of an example of the fuel cell system of the disclosed embodiments.

A fuel cell system 100 shown in FIG. 1 includes a fuel cell 10, an oxidant gas supplier 20, an oxidant gas supply flow path 21, an oxidant off-gas discharge flow path 22, an oxidant gas pressure control valve 23, an oxidant gas bypass flow path 24, a bypass valve 25, a controller 50, a hydrogen concentration sensor 60, and an oxidant gas flow rate sensor 70 as the oxidant gas system of the fuel cell. In FIG. 1, only the oxidant gas system is illustrated, and other systems such as the fuel gas system and the cooling system are not illustrated.

The oxidant gas bypass flow path 24 connects the branch 40 of the oxidant gas supply flow path 21 and a first junction 41 of the oxidant off-gas discharge flow path 22.

As indicated by a dashed line, the controller 50 is electrically connected to the oxidant gas supplier 20, the oxidant gas pressure control valve 23, the bypass valve 25, the hydrogen concentration sensor 60, and the oxidant gas flow rate sensor 70.

Figure 2:
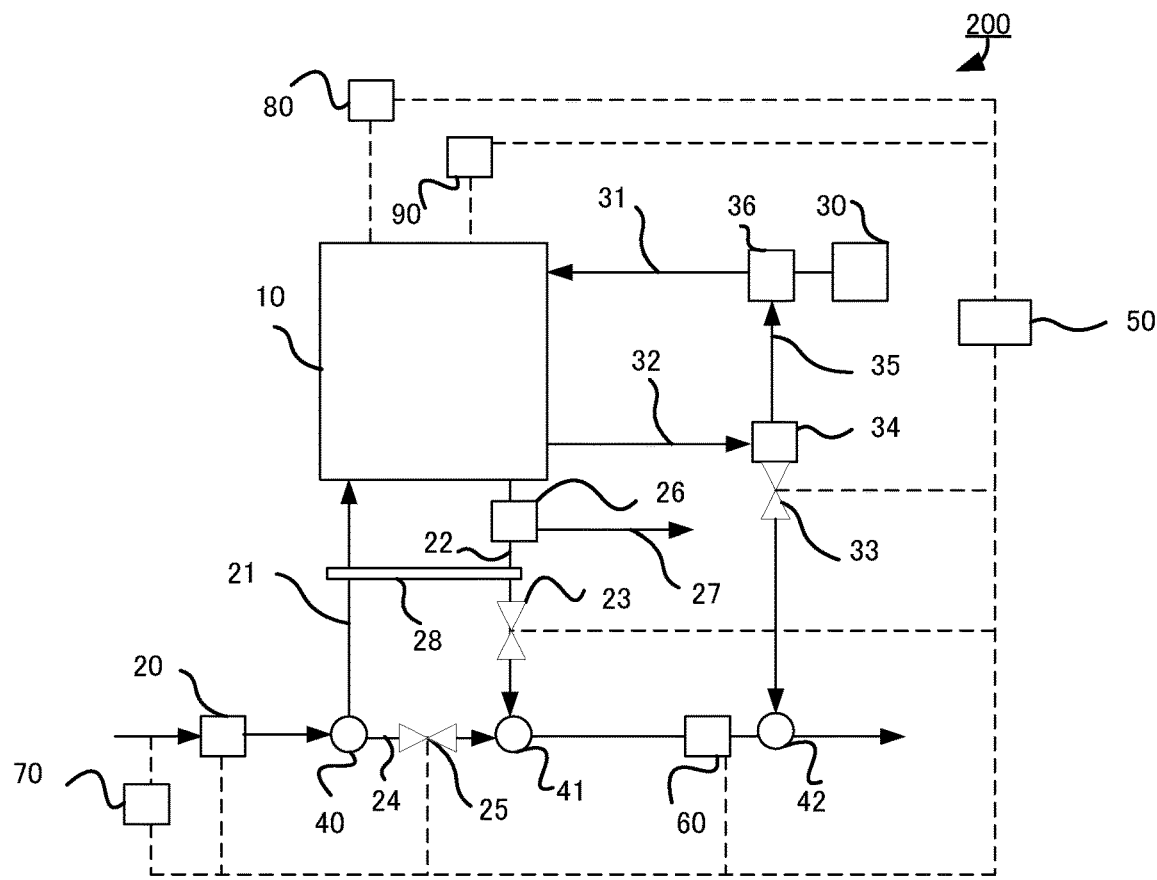
FIG. 2 is a schematic configuration diagram of another example of the fuel cell system of the disclosed embodiments.

FIG. 2 is a schematic configuration diagram of another example of the fuel cell system of the disclosed embodiments.

A fuel cell system 200 shown in FIG. 2 includes a fuel cell 10, an oxidant gas supplier 20, an oxidant gas supply flow path 21, an oxidant off-gas discharge flow path 22, an oxidant gas pressure control valve 23, an oxidant gas bypass flow path 24, a bypass valve 25, a cathode gas-liquid separator 26, a water discharge flow path 27, a humidifier 28, a fuel gas supplier 30, a fuel gas supply flow path 31, a fuel off-gas discharge flow path 32, a vent and discharge valve 33, an anode gas-liquid separator 34, a circulation flow path 35, an ejector 36, a controller 50, a hydrogen concentration sensor 60, an oxidant gas flow rate sensor 70, a temperature sensor 80, and a current sensor 90. In FIG. 2, illustration of the cooling system and the like is omitted.

The oxidant gas bypass flow path 24 connects the branch 40 of the oxidant gas supply flow path 21 and a first junction 41 of the oxidant off-gas discharge flow path 22.

The fuel off-gas discharge flow path 32 joins the oxidant off-gas discharge flow path 22 at a second junction 42 that is disposed downstream from the hydrogen concentration sensor 60 of the oxidant off-gas discharge flow path 22.

The hydrogen concentration sensor 60 is disposed in a region between the first junction 41 and the second junction 42.

As indicated by a dashed line, the controller 50 is electrically connected to the oxidant gas supplier 20, the oxidant gas pressure control valve 23, the bypass valve 25, the fuel gas supplier 30, the vent and discharge valve 33, the hydrogen concentration sensor 60, the oxidant gas flow rate sensor 70, the temperature sensor 80, and the current sensor 90.

Figure 3:
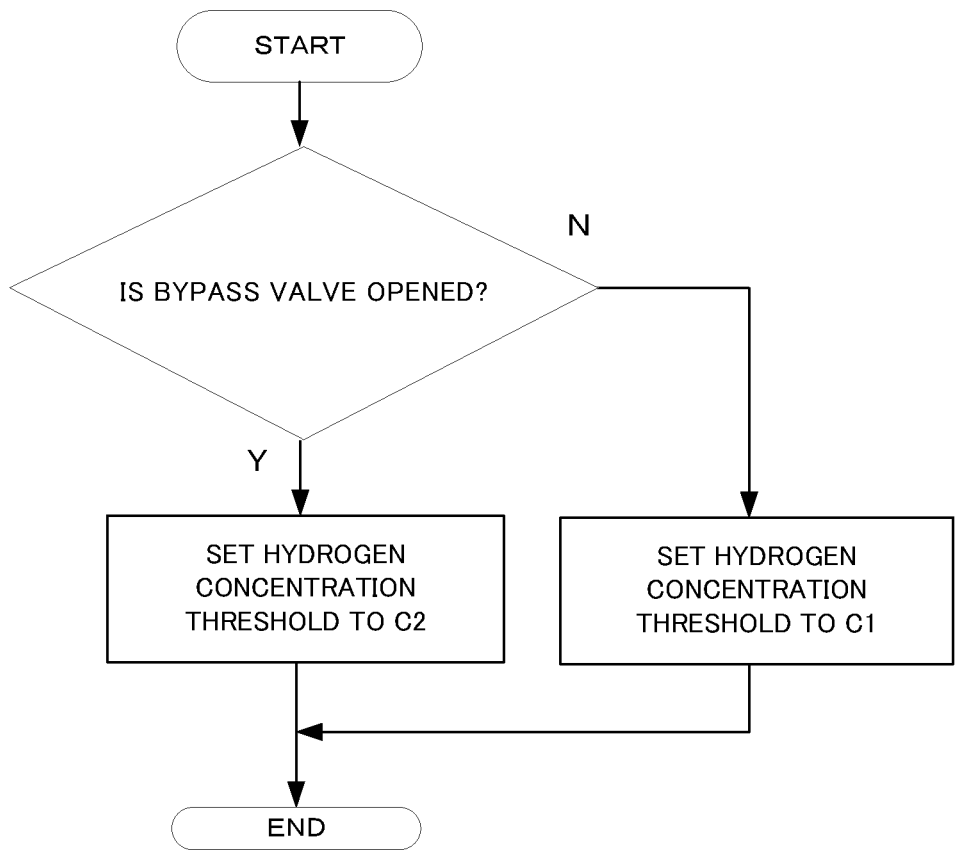
FIG. 3 is a flowchart illustrating an example of the control of the fuel cell system of the disclosed embodiments.

FIG. 3 is a flowchart illustrating an example of the control of the fuel cell system of the disclosed embodiments.

Before the controller determines whether or not a cross leak has occurred, the controller determines whether or not the bypass valve is opened.

When the controller determines that the bypass valve is opened, the controller sets the hydrogen concentration threshold used for determining whether or not a cross leak has occurred, to the second concentration threshold C2 which is larger than the first concentration threshold C1. Then, the controller ends the control.

On the other hand, when the controller determines that the bypass valve is closed, the controller sets the hydrogen concentration threshold used for determining whether or not a cross leak has occurred, to the first concentration threshold C1. Then, the controller ends the control.

After the controller ends the control, the hydrogen concentration sensor may measure the hydrogen concentration of the oxidant off-gas, and the controller may determine whether or not a cross leak has occurred, from the hydrogen concentration of the oxidant off-gas measured by the hydrogen concentration sensor.

The time to start second and subsequent controls after the end of the first control, is not particularly limited. They may be performed immediately after the end of the first control; they may be performed at regular time intervals; or they may be performed after the controller determines whether or not a cross leak has occurred. The second and subsequent controls may be performed after the controller determines that a cross leak has not occurred.

Figure 4:
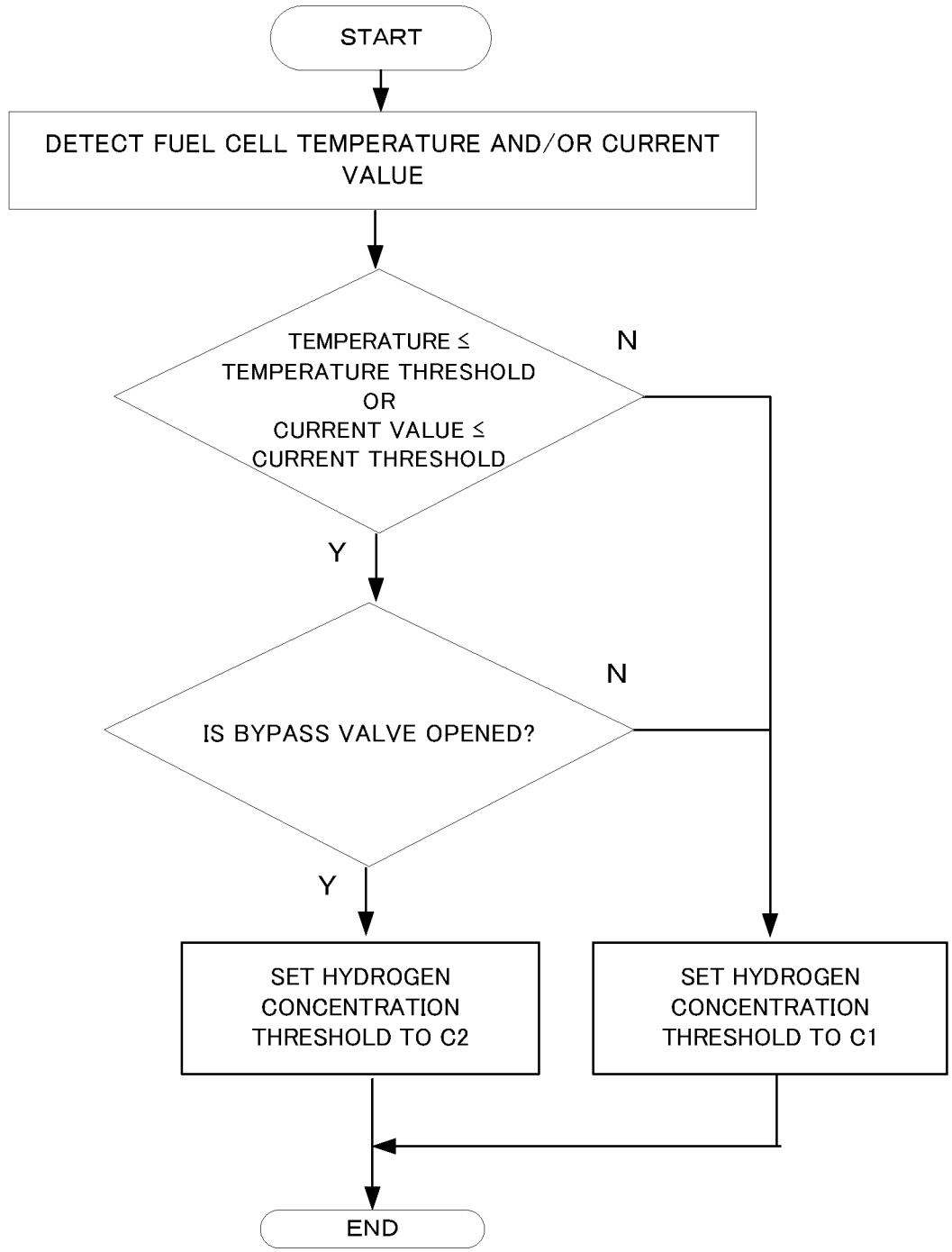
FIG. 4 is a flowchart illustrating another example of the control of the fuel cell system of the disclosed embodiments.

FIG. 4 is a flowchart illustrating another example of the control of the fuel cell system of the disclosed embodiments.

The temperature sensor detects the temperature of the fuel cell. The current sensor detects the current value of the fuel cell. At least one of the temperature detection and the current value detection may be performed, or both of them may be performed.

Before the controller determines whether or not a cross leak has occurred, the controller determines whether or not the temperature of the fuel cell detected by the temperature sensor is equal to or less than the optimum predetermined temperature threshold for operation of the fuel cell, or the controller determines whether or not the current value of the fuel cell detected by the current sensor is equal to or less than the predetermined current threshold.

When the controller determines that the temperature of the fuel cell detected by the temperature sensor exceeds the optimum predetermined temperature threshold for the operation of the fuel cell, or when the controller determines that the current value of the fuel cell detected by the current sensor exceeds the predetermined current threshold, the controller sets the hydrogen concentration threshold used for determining whether or not a cross leak has occurred, to the first concentration threshold C1.

On the other hand, when the controller determines that the temperature of the fuel cell detected by the temperature sensor is equal to or less than the optimum predetermined temperature threshold for the operation of the fuel cell, or when the controller determines that the current value of the fuel cell detected by the current sensor is equal to or less than the predetermined current threshold, the controller determines whether or not the bypass valve is opened.

When the controller determines that the bypass valve is opened, the controller sets the hydrogen concentration threshold used for determining whether or not a cross leak has occurred, to the second concentration threshold C2. Then, the controller ends the control.

When the controller determines that the bypass valve is closed, the controller sets the hydrogen concentration threshold used for determining whether or not a cross leak has occurred, to the first concentration threshold C1. Then, the controller ends the control.

After the controller ends the control, the hydrogen concentration sensor may measure the hydrogen concentration of the oxidant off-gas, and the controller may determine whether or not a cross leak has occurred, from the hydrogen concentration of the oxidant off-gas measured by the hydrogen concentration sensor.

The time to start the second and subsequent controls after the end of the first control, is not particularly limited. They may be performed immediately after the end of the first control; they may be performed at regular time intervals; or they may be performed after the controller determines whether or not a cross leak has occurred. The second and subsequent controls may be performed after the controller determines that a cross leak has not occurred.

REFERENCE SIGNS LIST

10: Fuel cell
20: Oxidant gas supplier
21: Oxidant gas supply flow path
22: Oxidant off-gas discharge flow path 23: Oxidant gas pressure control valve
24: Oxidant gas bypass flow path
25: Bypass valve
26: Cathode gas-liquid separator
27: Water discharge flow path
28: Humidifier
30: Fuel gas supplier
31: Fuel gas supply flow path
32: Fuel off-gas discharge flow path
33: Vent and discharge valve
34: Anode gas-liquid separator
35: Circulation flow path
36: Ejector
40: Branch
41: First junction
42: Second junction
50: Controller
60: Hydrogen concentration sensor
70: Oxidant gas flow rate sensor
80: Temperature sensor
90: Current sensor
100: Fuel cell system
200: Fuel cell system

The invention claimed is:

1. A fuel cell system,
wherein the fuel cell system comprises:
a fuel cell,
an oxidant gas supplier for supplying oxidant gas to the fuel cell,
an oxidant gas supply flow path connecting the oxidant gas supplier and an oxidant gas inlet of the fuel cell,
an oxidant gas flow rate sensor disposed in the oxidant gas supply flow path,
an oxidant off-gas discharge flow path for allowing oxidant off-gas to be discharged from an oxidant gas outlet of the fuel cell to the outside,
an oxidant gas bypass flow path branching from the oxidant gas supply flow path,
bypassing the fuel cell, and connecting a branch of the oxidant gas supply flow path and a first junction of the oxidant off-gas discharge flow path,
a bypass valve disposed in the oxidant gas bypass flow path,
a hydrogen concentration sensor disposed downstream from the first junction of the oxidant off-gas discharge flow path, and
a controller,
wherein the controller controls driving of the oxidant gas supplier and controls an opening degree of the bypass valve;
wherein the controller determines whether or not a cross leak has occurred, from the hydrogen concentration of the oxidant off-gas measured by the hydrogen concentration sensor;
wherein, when the hydrogen concentration of the oxidant off-gas measured by the hydrogen concentration sensor is equal to or more than a predetermined threshold, the controller determines that a cross leak has occurred;
wherein the controller preliminarily stores a first data group indicating a relationship between the flow rate of the oxidant gas, the opening degree of the bypass valve, and the hydrogen concentration of the oxidant off-gas;
wherein before the controller determines whether or not a cross leak has occurred, the controller varies the hydrogen concentration threshold used for determining whether or not a cross leak has occurred, by comparing the flow rate of the oxidant gas measured by the oxidant gas flow rate sensor and the opening degree of the bypass valve with the first data group; and
wherein the fuel cell system further comprises:
a cathode gas-liquid separator disposed upstream from the first junction of the oxidant off-gas discharge flow path, and
a water discharge flow path for allowing liquid water to be discharged from the cathode gas-liquid separator.

2. The fuel cell system according to claim 1,
wherein the fuel cell system further comprises a temperature sensor for detecting a temperature of the fuel cell;
wherein the oxidant gas supplier is an air compressor;
wherein the controller preliminarily stores a second data group indicating a relationship between a rotational frequency of the air compressor, the temperature of the fuel cell, and the hydrogen concentration of the oxidant off-gas; and
wherein before the controller determines whether or not a cross leak has occurred, the controller varies the hydrogen concentration threshold used for determining whether or not a cross leak has occurred, by comparing the rotational frequency of the air compressor and the temperature of the fuel cell measured by the temperature sensor with the second data group.

3. The fuel cell system according to claim 1,
wherein the fuel cell system further comprises:
a fuel gas supplier for supplying fuel gas to the fuel cell,
a fuel gas supply flow path connecting a fuel gas inlet of the fuel cell and the fuel gas supplier,
an ejector disposed in the fuel gas supply flow path,
a fuel off-gas discharge flow path for discharging, to the outside of the fuel cell system, the fuel off-gas discharged from a fuel gas outlet of the fuel cell,
an anode gas-liquid separator disposed in the fuel off-gas discharge flow path,
a vent and discharge valve disposed downstream from the anode gas-liquid separator of the fuel off-gas discharge flow path, and
a circulation flow path connecting the anode gas-liquid separator and the ejector;
wherein the oxidant off-gas discharge flow path includes, downstream from the first junction, a second junction where the fuel off-gas discharge flow path joins the oxidant off-gas discharge flow path; and
wherein the hydrogen concentration sensor is disposed in a region between the first and second junctions of the oxidant off-gas discharge flow path.

4. The fuel cell system according to claim 1,
wherein, before the controller determines whether or not a cross leak has occurred, the controller determines whether or not the bypass valve is opened;
wherein, when the controller determines that the bypass valve is opened, the controller sets the hydrogen concentration threshold used for determining whether or not a cross leak has occurred, to a second concentration threshold C2 which is larger than a first concentration threshold C1; and
wherein, when the controller determines that the bypass valve is closed, the controller sets the hydrogen concentration threshold used for determining whether or not a cross leak has occurred, to the first concentration threshold C1.

5. The fuel cell system according to claim 4,
wherein the fuel cell system further comprises a temperature sensor for detecting a temperature of the fuel cell;
wherein, before the controller determines whether or not a cross leak has occurred, the controller determines whether or not the temperature of the fuel cell detected by the temperature sensor is equal to or less than an optimum predetermined temperature threshold for operation of the fuel cell;

wherein, when the controller determines that the temperature of the fuel cell detected by the temperature sensor exceeds the optimum predetermined temperature threshold for the operation of the fuel cell, the controller sets the hydrogen concentration threshold used for determining whether or not a cross leak has occurred, to the first concentration threshold C1;

wherein, when the controller determines that the temperature of the fuel cell detected by the temperature sensor is equal to or less than the optimum predetermined temperature threshold for the operation of the fuel cell, the controller determines whether or not the bypass valve is opened;

wherein, when the controller determines that the bypass valve is opened, the controller sets the hydrogen concentration threshold used for determining whether or not a cross leak has occurred, to the second concentration threshold C2; and wherein, when the controller determines that the bypass valve is closed, the controller sets the hydrogen concentration threshold used for determining whether or not a cross leak has occurred, to the first concentration threshold C1.

6. The fuel cell system according to claim 4, wherein the fuel cell system further comprises a current sensor for detecting a current value of the fuel cell;

wherein, before the controller determines whether or not a cross leak has occurred, the controller determines whether or not the current value of the fuel cell detected by the current sensor is equal to or less than a predetermined current threshold;

wherein, when the controller determines that the current value of the fuel cell detected by the current sensor exceeds the predetermined current threshold, the controller sets the hydrogen concentration threshold used for determining whether or not a cross leak has occurred, to the first concentration threshold C1;

wherein, when the controller determines that the current value of the fuel cell detected by the current sensor is equal to or less than the predetermined current threshold, the controller determines whether or not the bypass valve is opened;

wherein, when the controller determines that the bypass valve is opened, the controller sets the hydrogen concentration threshold used for determining whether or not a cross leak has occurred, to the second concentration threshold C2; and wherein, when the controller determines that the bypass valve is closed, the controller sets the hydrogen concentration threshold used for determining whether or not the cross leak has occurred, to the first concentration threshold C1.

* * * * *